(12) United States Patent
Spisic et al.

(10) Patent No.: US 11,783,177 B2
(45) Date of Patent: Oct. 10, 2023

(54) TARGET CLASS ANALYSIS HEURISTICS

(71) Applicant: International Business Machines Corporation, Armonk, NY (US)

(72) Inventors: Damir Spisic, Chicago, IL (US); Jing Xu, Xian (CN); Xue Ying Zhang, Xian (CN); Xing Wei, Xian (CN)

(73) Assignee: International Business Machines Corporation, Armonk, NY (US)

( * ) Notice: Subject to any disclaimer, the term of this patent is extended or adjusted under 35 U.S.C. 154(b) by 945 days.

(21) Appl. No.: 16/574,163

(22) Filed: Sep. 18, 2019

(65) Prior Publication Data

US 2021/0081767 A1     Mar. 18, 2021

(51) Int. Cl.
*G06N 3/08*     (2023.01)
*G06F 18/243*     (2023.01)
*G06N 3/047*     (2023.01)
*G06N 3/048*     (2023.01)

(52) U.S. Cl.
CPC ......... *G06N 3/08* (2013.01); *G06F 18/24323* (2023.01); *G06N 3/047* (2023.01); *G06N 3/048* (2023.01)

(58) Field of Classification Search
CPC ... G06N 3/0472; G06N 3/0481; G06K 9/6282
USPC .......................................................... 706/15
See application file for complete search history.

(56) References Cited

U.S. PATENT DOCUMENTS

| | | | |
|---|---|---|---|
| 2003/0179236 A1* | 9/2003 | Good | G06F 16/353 715/764 |
| 2003/0204507 A1 | 10/2003 | Li et al. | |
| 2017/0032247 A1 | 2/2017 | Tadesse et al. | |

FOREIGN PATENT DOCUMENTS

CN          103761210 B     2/2018

OTHER PUBLICATIONS

Derthick, et al., "An interactive visualization environment for data exploration", KDD-97 Proceedings, 1997 (Year: 1997).*

(Continued)

*Primary Examiner* — Tsu-Chang Lee
(74) *Attorney, Agent, or Firm* — Grant M. McNeilly

(57) ABSTRACT

A set of classifiable data containing a plurality of classes is ingested. A target class within the plurality of classes is determined. Using the set of classifiable data, an interactive recall rate chart is generated, and the interactive recall rate chart shows a set of target class recall rates against a set of class recall rates for the remainder of the plurality of classes. The interactive recall rate chart is presented to a user. A target class recall rate selection from the set of target class recall rates is received from the user. The set of classifiable data is reclassified, based on the target class recall rate selection.

20 Claims, 9 Drawing Sheets

(56) References Cited

OTHER PUBLICATIONS

Rees et al. "ROC Method for the Evaluation of Multi-class Segmentation/Classification Algorithms with Infrared Imagery". BMVC, Research Gate, Jan. 2003, 11 pages.
Landgrebe et al., "Efficient multiclass ROC approximation by decomposition via confusion matrix perturbation analysis", IEEE Transactions On Pattern Analysis and Machine Intelligence, 2007, Research Gate, 36 pages.
O'Brien et al., "Cost-sensitive multi-class classification from probability estimates", Proceedings of the 25th International Conference on Machine Learning, 8 pages, 2008.
Alsallakh et al., "Visual Methods for Analyzing Probabilistic Classification Data", IEEE Transactions on Visualization and Computer Graphics, Dec. 2014, 11 pages. https://www.researchgate.net/profile/Silvia_Miksch/publication/270789956_Visual_Methods_for_Analyzing_Probabilistic_Classification_Data/links/564ed39208ae4988a7a64ba2/Visual-Methods-for-Analyzing-Probabilistic-Classification-Data.pdf?.

\* cited by examiner

TARGET CLASS ANALYSIS HEURISTICS

BACKGROUND

The present disclosure relates generally to the field of classification models, and more particularly to enhancing target class analysis.

Category distribution of a target field (e.g., the proportion of records belonging to each category in the target field) plays an important role in classification models. Imbalanced data, where one or more categories are dwarfed in comparison to the others in the field, is not uncommon.

SUMMARY

Embodiments of the present disclosure include a method, computer program product, and system for enhancing target class analysis.

A set of classifiable data containing a plurality of classes is ingested. A target class within the plurality of classes is determined. Using the set of classifiable data, an interactive recall rate chart is generated, and the interactive recall rate chart shows a set of target class recall rates against a set of class recall rates for the remainder of the plurality of classes. The interactive recall rate chart is presented to a user. A target class recall rate selection from the set of target class recall rates is received from the user. The set of classifiable data is reclassified, based on the target class recall rate selection.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
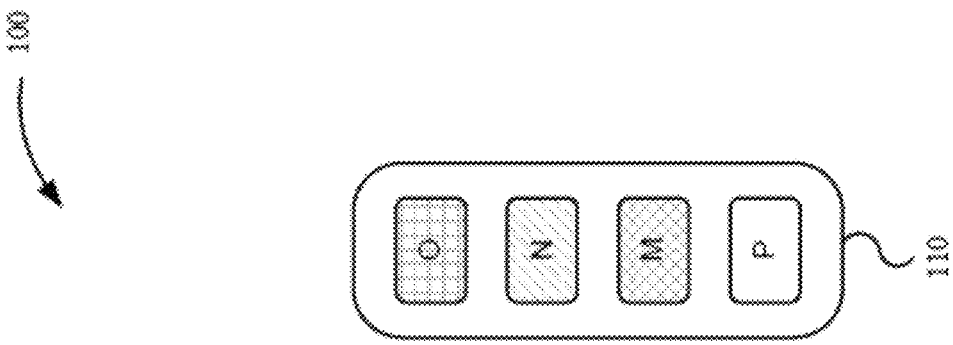
FIG. 1 illustrates an example pie chart of an imbalanced category distribution of a target field, in accordance with embodiments of the present disclosure.
Figure 1:
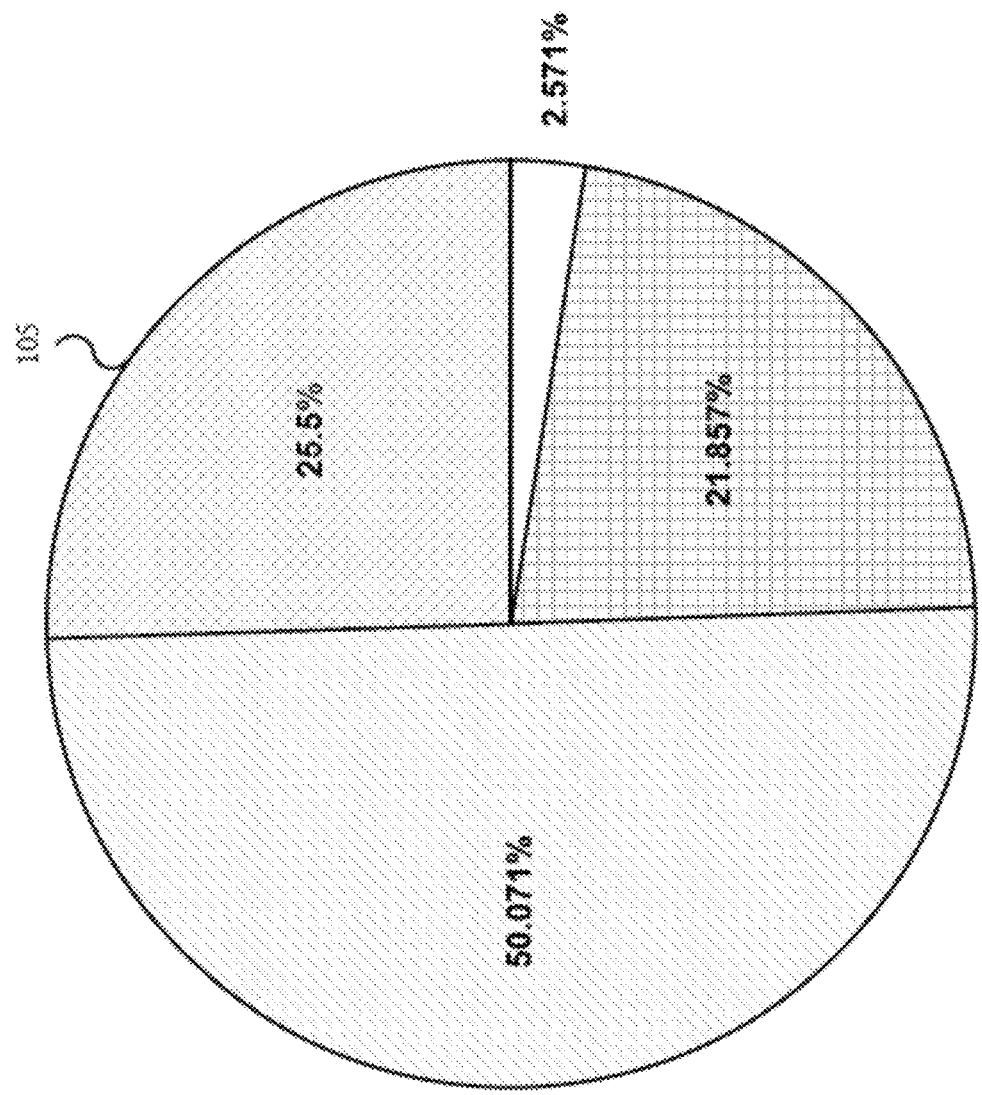

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of classification models, and more particularly to enhancing target class analysis. While the present disclosure is not necessarily limited to such applications, various aspects of the disclosure may be appreciated through a discussion of various examples using this context.

Category distribution of a target field plays an important role in classification. Imbalanced data may result in one category is underrepresented in the target field, and this underrepresentation may present challenges to the accuracy of the classifier. For example, if a binary target has an imbalance ration of 1:100, the classifier (e.g., classifier type neural network) may obtain an accuracy of 99% by ignoring the minority class altogether. This necessarily means that the classifier loses its ability to properly classify the minority class when a new set of data is introduced. This concept applies to multiclass scenarios as well as binary scenarios.

As an example, a classifier type neural network may be configured to read and recognize handwritten text. Because "e" is the most common letter in the English alphabet, it would most likely represent the largest class of data in this example, and therefore one could expect the neural network to become adept, or accurate, at identifying a handwritten "e." However, much less-common letters, such as "q," may be seldom encountered. This may lead to a scenario of data imbalance, where the neural network may reach 99.9% accuracy when reading a given set of text, even though the neural network has "learned" to simply ignore the letter "q." When reading a new set of text where "q" is prevalent (e.g., a poem of alliteration focusing on "q," a set of mathematical equations where "q" is a common variable, etc.), the neural network may mistake "q" for "g," leading to a plethora of errors and inaccuracies.

Embodiments of the present disclosure contemplate a heuristic technique which may account for data imbalance scenarios and ensure that a classifier gains the ability to properly classify a target class. Embodiments may also provide techniques for balancing the classifier's accuracy over a plurality of classes. Additionally, embodiments contemplate the use of an interactive graphical user interface (GUI) to provide a user with a simple and user-friendly experience for selecting recall rates (e.g., accuracy levels) for multiple classes within a target field. In embodiments, geometric mean (G-mean) and F-measure (e.g., F1 score, F-score) criteria may be leveraged to provide suggestions and guidance to a user when selecting recall rates.

Referring now to FIG. 1, illustrated is an example pie chart 105 of an imbalanced category distribution of a target field 100, in accordance with embodiments of the present disclosure. Pie chart 105 is for example purposes, and in practice may include more or fewer slices of any percentage of the total chart. Legend 110 depicts the classes (M, N, O, P) represented in pie chart 105. The class designations illustrated here are arbitrary and for example purposes—they should not be construed to limit the disclosure in any way, and the classes may be represented in any appropriate manner in practice (e.g., with numbers, letters, icons, pictures, colors, etc.).

Pie chart 105 depicts an imbalanced data set where class "P" is a minority class. Therefore, a classifier trained to differentiate and classify a dataset among classes "M," "N," "O," and "P" may obtain an accuracy of 97.428% (the pie slices of M+N+O=97.428) by ignoring any data that could/should be classified as "P." This may lead to a scenario where, upon ingesting a new dataset where P-class data is prevalent, a set of P-class data is miscategorized as belonging to other classes.

Figure 2:
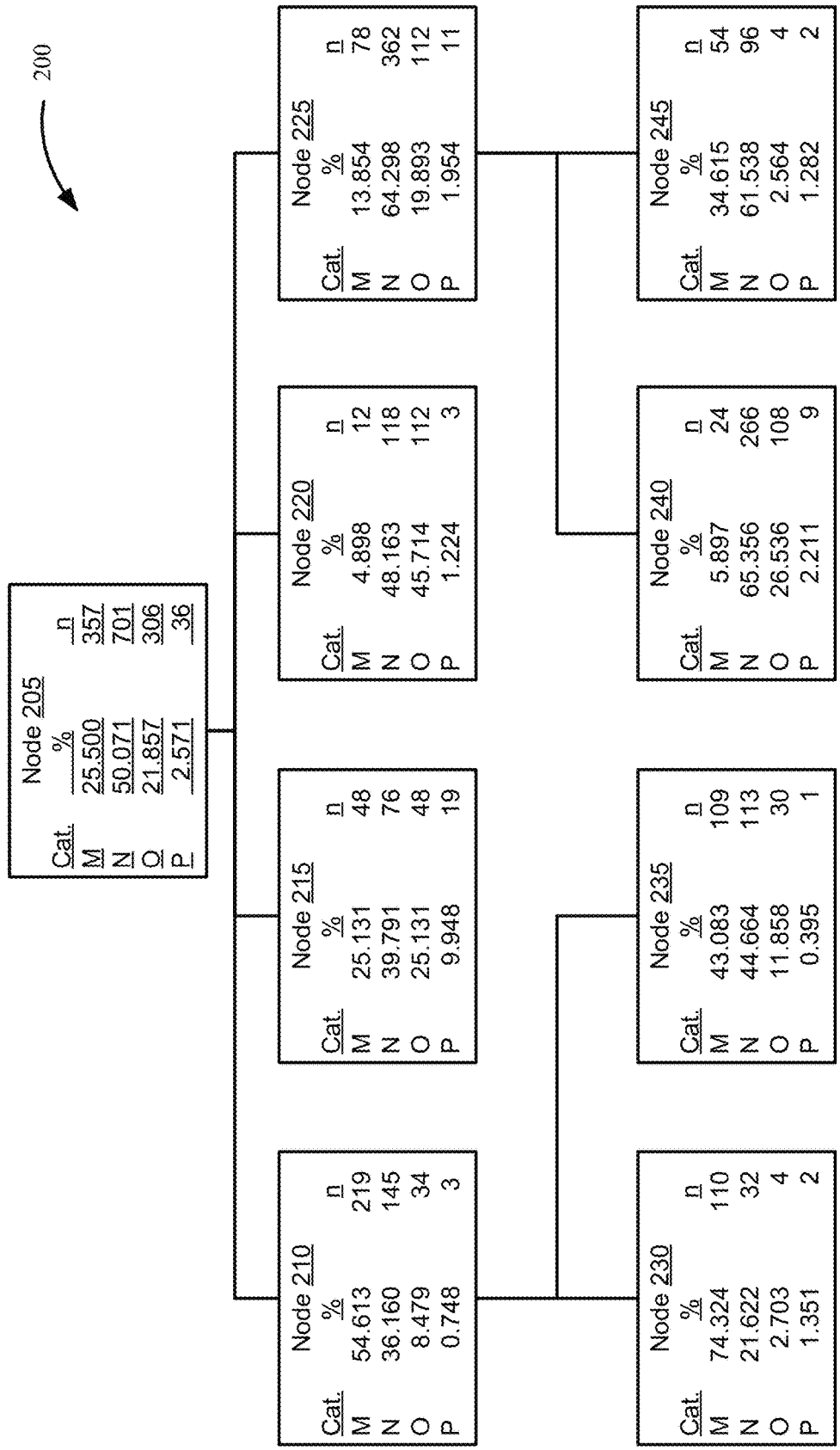
FIG. 2 illustrates an example of a classification tree, in accordance with embodiments of the present disclosure.

Referring now to FIG. 2, illustrated is an example of a classification tree 200, in accordance with embodiments of the present disclosure. In embodiments, classification tree 200 may be a Chi-squared Automatic Interaction Detection (CHAID) tree. Classification tree 200 may include any number of nodes; classification tree 200 is for example purposes and should not be construed as limiting in any sense.

As depicted, classification tree 200 contains a root node 205, internal nodes 210 and 225, and leaf nodes 215, 220, 230, 235, 240, and 245. The data contained within classification tree 200 may represent any classifiable data (e.g., survey results, letter/number recognition probabilities, multiple-choice test answers, etc.)

Using survey results of an airport satisfaction survey as an example, each node may contain a set of classes or categories (e.g., column "Cat."), represented here, again, with "M," "N," "O," and "P." "M" may correspond to "very satisfied," "N" may correspond to "somewhat satisfied," "O" may correspond to "somewhat dissatisfied," and "P" may correspond to "very dissatisfied." In some embodiments, each node may contain the number of datapoints (e.g., column "n") and/or information regarding the percentage of datapoints in each category (e.g., column "%").

In this example, each leaf node may represent some aspect of the target field, and each internal node may represent an aggregation of data regarding a sub-field, or two related aspects of the target field. In this example, the target field may be overall satisfaction with the airport. Each leaf node may represent a particular survey, or a particular question from a survey. For example, leaf node 235 may provide data regarding survey answers to a question regarding traveler satisfaction with the speed of moving walkways, leaf node 230 may provide data regarding traveler satisfaction with art displayed in the airport and the art displayed near moving walkways, and internal node 210 may provide a representation of the aggregate data regarding overall satisfaction with the moving walkway system. Following this mode, leaf nodes 215, 220, 240, and 245 may represent traveler satisfaction with other aspect of the airport, and root node 205 may represent overall satisfaction with the airport, taking all of the data within the classification tree 200.

Figure 3:
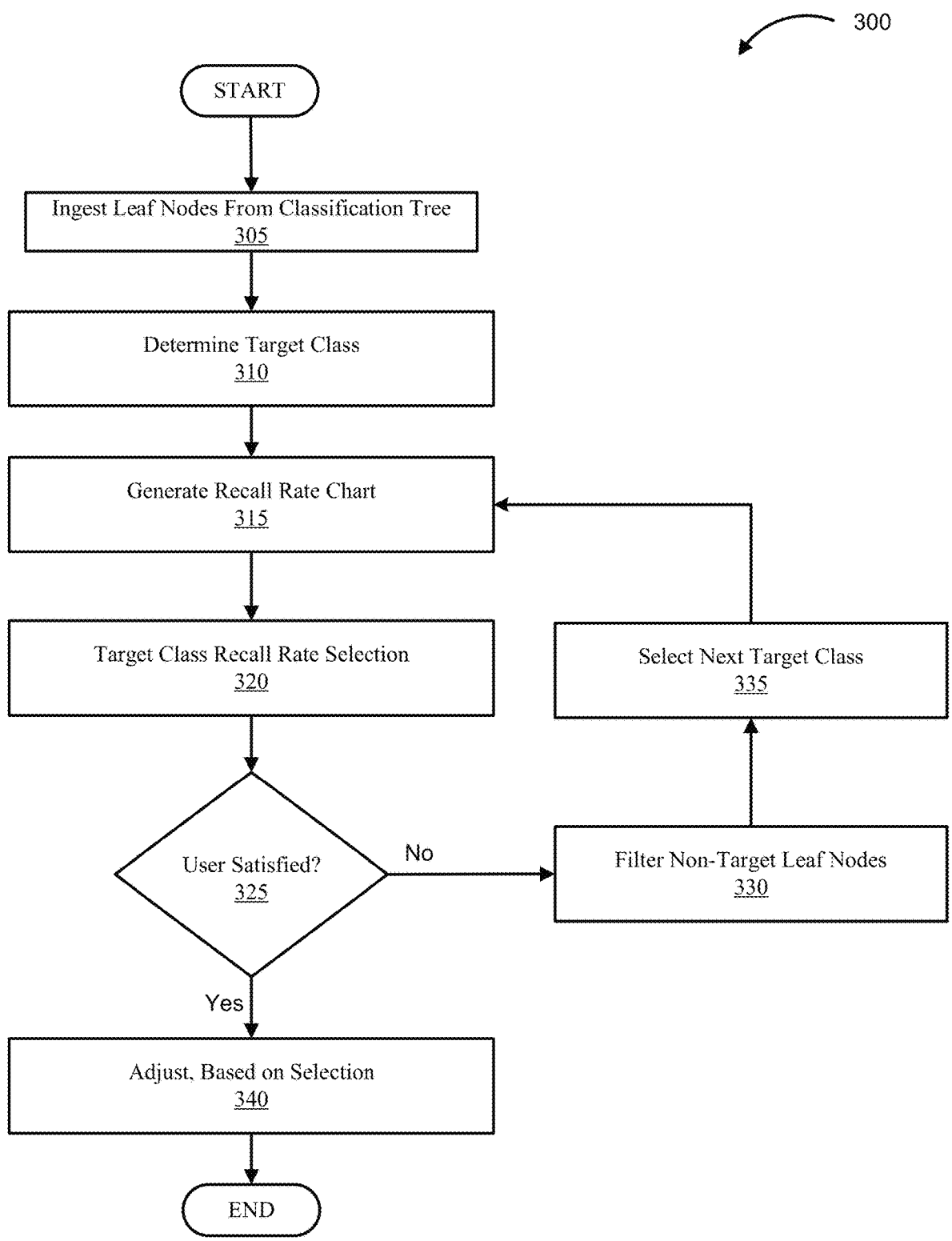
FIG. 3 illustrates a flowchart of a method for adjusting target class recall rates for selected categories, in accordance with embodiments of the present disclosure.

Referring now to FIG. 3, depicted is a method 300 for adjusting target class recall rates for selected categories, in accordance with embodiments of the present disclosure. Method 300 may begin at 305, where leaf node from a classification tree are ingested. For each category C, the number of cases that falls into a leaf node i may be represented with $\{N_C^i\}$.

At 310, a target class, which may be represented as $C=C_T$, is determined. In some embodiments, the target class may be determined by the heuristic system (e.g., a default target class may be the one with the smallest number of records/cases belonging to it). In some embodiments, a user may select/determine the target class.

At 315, a target recall rate (e.g., accuracy rate) chart may be generated. Additional information regarding the generation of the recall rate chart is discussed with regard to FIG. 4, and examples of interactive recall rate charts are shown and discussed with regard to FIGS. 5A-5C.

At 320, a target class recall rate selection is made. In some embodiments, the selection may be automatically performed by the heuristic system, or the selection may be made by a user. In some embodiments, the heuristic system may provide a pre-selected target class recall rate selection suggestion, to be confirmed by a user. In some embodiments, suggestions may be provided based on G-mean and/or F-measure analyses.

At 325, it is determined whether the user is satisfied. If the user is satisfied with the target class recall rate selection, adjustments may be made at 340 to account for the selected target class recall rate. This may include, for example, an adjustment of weights/biases in a neural network to reflect the selected target class recall rate.

If, at 325, the user is not satisfied (e.g., if the user wished to select recall rates for a secondary/tertiary/minor class), the non-target leaf nodes may be filtered from the ingested classification tree at 330.

In some embodiments, the heuristic system may, at 335, select the next target class (e.g., the secondary class, or the class with the second-least number of records). In some embodiments, the user may select the secondary class, or the user may select another class of interest (e.g., target class), such as a tertiary or other minor class.

Figure 4:
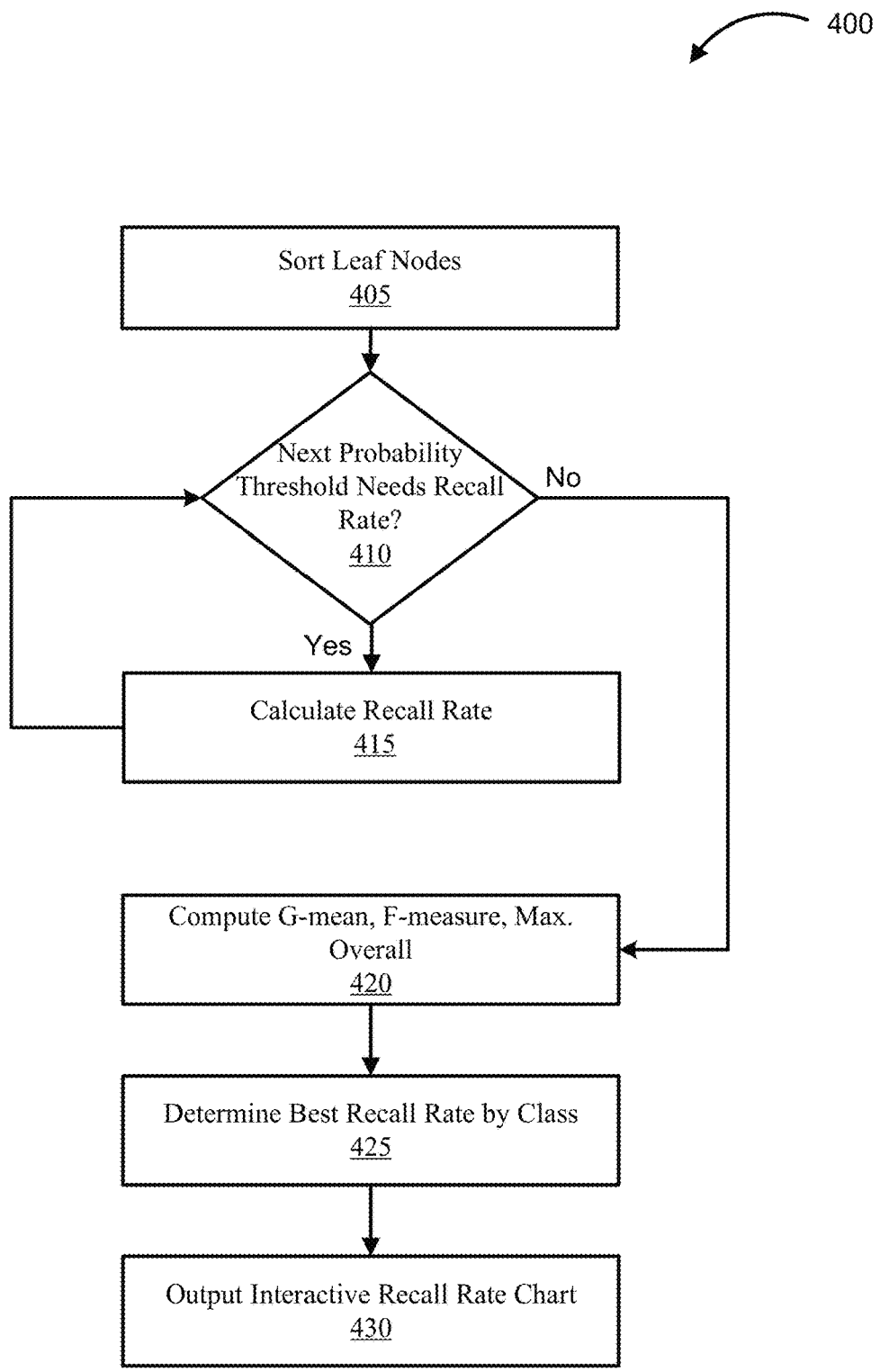
FIG. 4 illustrates a flowchart of a method for generating a recall rate chart, in accordance with embodiments of the present disclosure.

Referring now to FIG. 4, illustrated is a flowchart of a method 400 for generating a recall rate chart, in accordance with embodiments of the present disclosure. Method 400 may be a more detailed description of 315 of FIG. 3. At 405, the leaf nodes of a classification tree are sorted according to probability of the target class (e.g., the probability that the data in the leaf node represents/calls for the target class). As the target class probability threshold moves from higher values to lower values (e.g., from 100% to 0%), more and more leaf nodes are assigned to the target class.

At 410, it is determined whether the next probability threshold needs recall rates calculated. If the next probability threshold needs a recall rate, the recall rate is calculated at 415. If, however, all the probability thresholds have been accounted for, the method may proceed to 420. This provides a set of recall rates for the target class and each of the non-target classes.

At 420, G-mean, F-measure, and a maximum overall accuracy are calculated for the target class and each of the non-target classes, using the set of recall rates provided at 410.

At 430, the "best" recall rate for each class is determined. This may be achieved by selecting the recall rate with the highest value (e.g., most accurate) for each class.

At 440, an interactive recall rate chart is output. This may include displaying the interactive recall rate chart to a user for target class recall rate selection (e.g., 320 of FIG. 3).

Figure 5A:
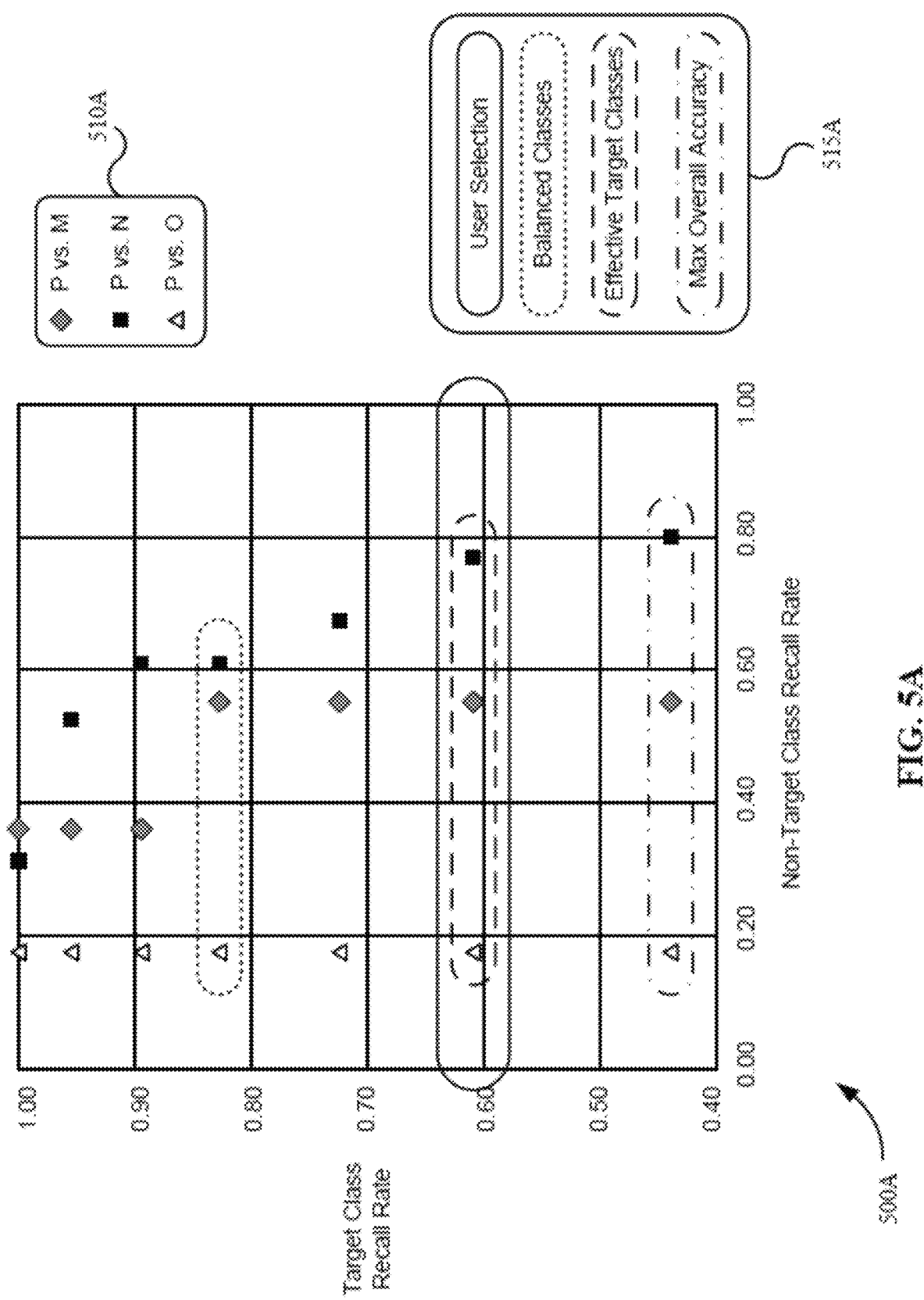
FIG. 5A illustrates an example of an interactive recall rate chart for a target class, according to an embodiment of the present disclosure.

Referring now to FIG. 5A, illustrated is an example 500A of an interactive recall rate chart for a target class, according to an embodiment of the present disclosure. Example 500A of an interactive recall rate chart for a target class may include, for example, a key 510A and a recall rate descriptor 515A.

Example 500A includes a y-axis that represents the recall rate for the target class (here, class "P" is the target class).

The x-axis represents the recall rates for the non-target classes (here, classes "M," "N," and "O").

As depicted in recall rate descriptor 515A, sets of points corresponding to the calculated G-mean (e.g., "balanced classes"), F-measure (e.g., "effective target classes"), and maximum overall accuracy (e.g., max overall accuracy) are indicated with the corresponding border/selection fields. Additionally, the user's selected target class recall rate (e.g., "user selection") is also displayed.

In example 500A, the user has selected the target class recall rate that corresponds to a suggested target class recall rate, based on an F-measure calculation. As depicted, the target class recall rate would be approx. 0.61 (e.g., 61%), and the recall rates for the non-target classes would be approx. 0.18 for "O," 0.54 for "M," and 0.76 for "N." This does, however, assume that no further adjustment/balancing is performed (e.g., user is satisfied at 325 of FIG. 3).

However, if the user wishes to further balance the data, the non-target leaf nodes may be filtered (e.g., 330 of FIG. 3), and the user may select (or, in embodiments, the heuristic system may select) a next target class (e.g., 335 of FIG. 3), and a new interactive recall rate chart may be generated.

Figure 5B:
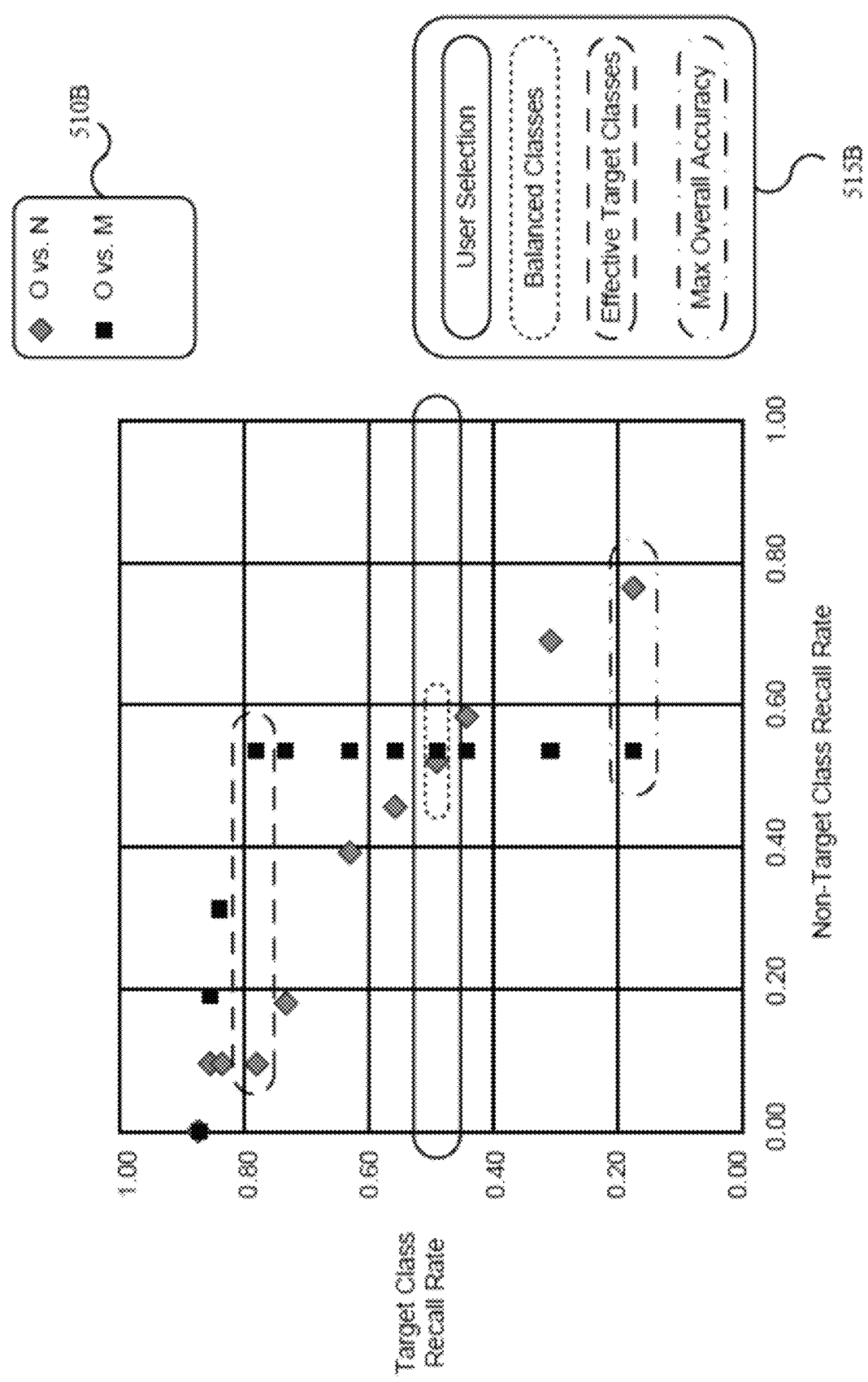
FIG. 5B illustrates an example of an interactive recall rate chart for a secondary target class, according to an embodiment of the present disclosure.

Referring now to FIG. 5B, a second example 500B of an interactive recall rate chart for a secondary target class is depicted, according to an embodiment of the present disclosure. In example 500B (continuing from example 500A), non-target class "O" was selected as the next target class, or the secondary class. Example 500B also contains a key 510B, and a recall rate descriptor 515B.

Example 500B may be generated using the same procedures that were employed to generate example 500A, however the leaf nodes have been filtered to account for the fact that a recall rate has already been selected for the original target class "P."

Example 500B includes suggestions for target class recall rate selections based on G-mean (e.g., "balanced classes"), F-measure (e.g., "effective target classes"), and maximum overall accuracy (e.g., max overall accuracy), which are indicated with the corresponding border/selection fields. Additionally, the user's selected target class recall rate (e.g., "user selection") is also displayed.

In Example 500B, the user has selected the G-mean suggestion (e.g., "balanced classes"). As depicted, the target class recall rate is approx. 0.49, and the non-target recall rates are approx. 0.53 for "N" and 0.54 for "M." This does, however, assume that no further adjustment/balancing is performed (e.g., user is satisfied at 325 of FIG. 3).

However, if the user wishes to further balance the data, the non-target leaf nodes may be filtered again (e.g., 330 of FIG. 3), and the user may select (or, in embodiments, the heuristic system may select) a next target class (e.g., 335 of FIG. 3), and a new interactive recall rate chart may be generated.

Figure 5C:
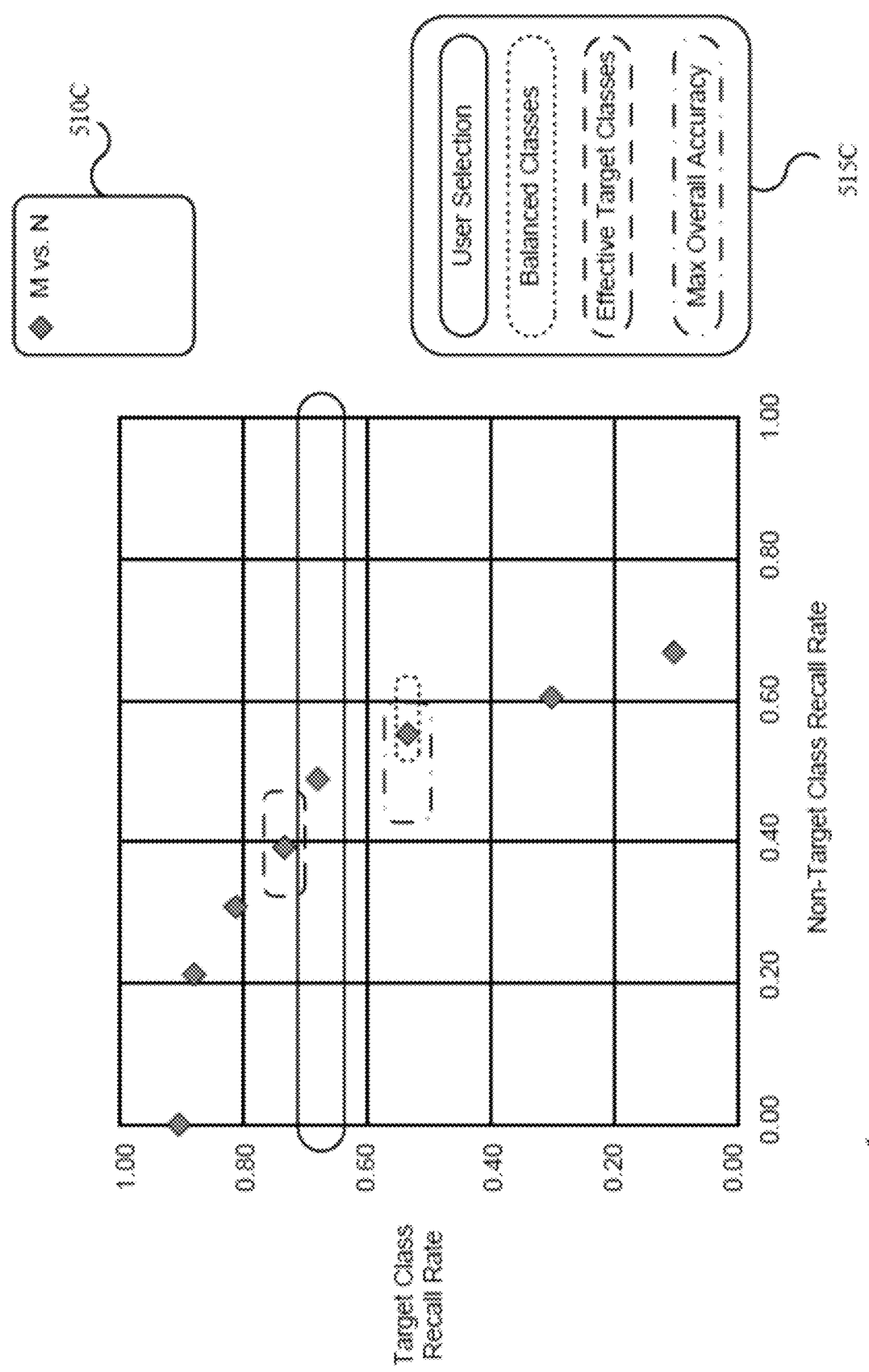
FIG. 5C illustrates an example of an interactive recall rate chart for a minor target class, according to an embodiment of the present disclosure.

Referring now to FIG. 5C, a third example 500C of an interactive recall rate chart for a minor target class is depicted, according to an embodiment of the present disclosure. In example 500C (continuing from example 500B), non-target class "M" was selected as the next target class, or the minor class. Example 500C also contains a key 510C, and a recall rate descriptor 515C.

Example 500C may be generated using the same procedures that were employed to generate examples 500A and 500B, however the leaf nodes have been filtered to account for the fact that a recall rate has already been selected for the original target class "P" and the secondary class "O."

Example 500C includes suggestions for target class recall rate selections based on G-mean (e.g., "balanced classes"), F-measure (e.g., "effective target classes"), and maximum overall accuracy (e.g., max overall accuracy), which are indicated with the corresponding border/selection fields. Additionally, the user's selected target class recall rate (e.g., "user selection") is also displayed.

In Example 500C, the user has selected none of the suggestions from the G-mean, F-measure, or maximum overall accuracy suggestions. As depicted, the target class recall rate is approx. 0.67, and the non-target recall rate is approx. 0.47 for "N." At this point, the heuristic system may assume, in some embodiments, that the user is satisfied, as no additional interactive recall rates may be generated from a singular class of data. However, in embodiments, the user may be asked if they would like to review or alter their recall rate selections.

Figure 6:
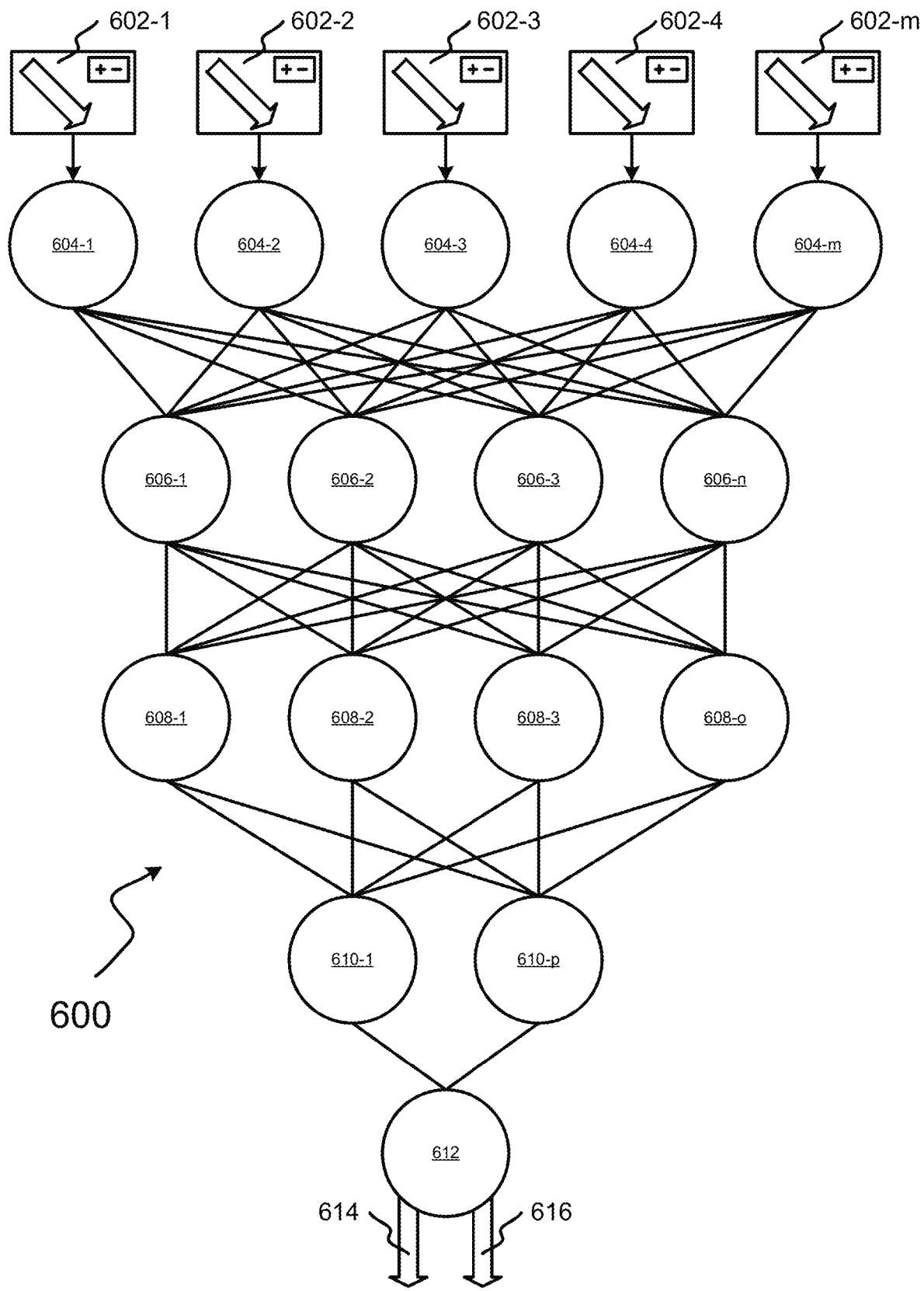
FIG. 6 illustrates an example neural network that may be specialized to operate using target class recall rate selections from an interactive recall rate chart, in accordance with embodiments of the present disclosure.

FIG. 6 depicts an example neural network 600 that may be specialized to operate using target class recall rate selections from an interactive recall rate chart, in accordance with embodiments of the present disclosure. Inputs may include, for example, data for classification, as described herein. In embodiments, neural network 600 may be a classifier-type neural network. Neural network 600 may be part of a larger neural network. For example, neural network 600 may be nested within a single, larger neural network, connected to several other neural networks, or connected to several other neural networks as part of an overall aggregate neural network.

Inputs 602-1 through 602-$m$ represent the inputs to neural network 600. In this embodiment, 602-1 through 602-$m$ do not represent different inputs. Rather, 602-1 through 602-$m$ represent the same input that is sent to each first-layer neuron (neurons 604-1 through 604-$m$) in neural network 600. In some embodiments, the number of inputs 602-1 through 602-$m$ (i.e., the number represented by m) may equal (and thus be determined by) the number of first-layer neurons in the network. In other embodiments, neural network 600 may incorporate 1 or more bias neurons in the first layer, in which case the number of inputs 602-1 through 602-$m$ may equal the number of first-layer neurons in the network minus the number of first-layer bias neurons. In some embodiments, a single input (e.g., input 602-1) may be input into the neural network. In such an embodiment, the first layer of the neural network may comprise a single neuron, which may propagate the input to the second layer of neurons.

Inputs 602-1 through 602-$m$ may comprise one or more samples of classifiable data. For example, inputs 602-1 through 602-$m$ may comprise 10 samples of classifiable data. In other embodiments, not all samples of classifiable data may be input into neural network 600.

Neural network 600 may comprise 5 layers of neurons (referred to as layers 604, 606, 608, 610, and 612, respectively corresponding to illustrated nodes 604-1 to 604-$m$, nodes 606-1 to 606-$n$, nodes 608-1 to 608-$o$, nodes 610-1 to 610-$p$, and node 612). In some embodiments, neural network 600 may have more than 5 layers or fewer than 5 layers. These 5 layers may each be comprised of the same number of neurons as any other layer, more neurons than any other layer, fewer neurons than any other layer, or more neurons than some layers and fewer neurons than other layers. In this embodiment, layer 612 is treated as the output layer. Layer 612 outputs a probability that a target event will occur, and contains only one neuron (neuron 612). In other embodiments, layer 612 may contain more than 1 neuron. In this illustration no bias neurons are shown in neural network 600. However, in some embodiments each layer in neural network 600 may contain one or more bias neurons.

Layers 604-612 may each comprise an activation function. The activation function utilized may be, for example, a rectified linear unit (ReLU) function, a SoftPlus function, a Soft step function, or others. Each layer may use the same activation function but may also transform the input or output of the layer independently of or dependent upon the ReLU function. For example, layer 604 may be a "dropout" layer, which may process the input of the previous layer (here, the inputs) with some neurons removed from processing. This may help to average the data and can prevent overspecialization of a neural network to one set of data or several sets of similar data. Dropout layers may also help to prepare the data for "dense" layers. Layer 606, for example, may be a dense layer. In this example, the dense layer may process and reduce the dimensions of the feature vector (e.g., the vector portion of inputs 602-1 through 602-*m*) to eliminate data that is not contributing to the prediction. As a further example, layer 608 may be a "batch normalization" layer. Batch normalization may be used to normalize the outputs of the batch-normalization layer to accelerate learning in the neural network. Layer 610 may be any of a dropout, hidden, or batch-normalization layer. Note that these layers are examples. In other embodiments, any of layers 604 through 610 may be any of dropout, hidden, or batch-normalization layers. This is also true in embodiments with more layers than are illustrated here, or fewer layers.

Layer 612 is the output layer. In this embodiment, neuron 612 produces outputs 614 and 616. Outputs 614 and 616 represent complementary probabilities that a target event will or will not occur. For example, output 614 may represent the probability that a target event will occur, and output 616 may represent the probability that a target event will not occur. In some embodiments, outputs 614 and 616 may each be between 0.0 and 1.0, and may add up to 1.0. In such embodiments, a probability of 1.0 may represent a projected absolute certainty (e.g., if output 614 were 1.0, the projected chance that the target event would occur would be 100%, whereas if output 416 were 1.0, the projected chance that the target event would not occur would be 100%).

In embodiments, FIG. 6 illustrates an example probability-generator neural network with one pattern-recognizer pathway (e.g., a pathway of neurons that processes one set of inputs and analyzes those inputs based on recognized patterns, and produces one set of outputs). However, some embodiments may incorporate a probability-generator neural network that may comprise multiple pattern-recognizer pathways and multiple sets of inputs. In some of these embodiments, the multiple pattern-recognizer pathways may be separate throughout the first several layers of neurons, but may merge with another pattern-recognizer pathway after several layers. In such embodiments, the multiple inputs may merge as well (e.g., several smaller vectors may merge to create one vector). This merger may increase the ability to identify correlations in the patterns identified among different inputs, as well as eliminate data that does not appear to be relevant.

In embodiments, neural network 600 may be trained/adjusted (e.g., biases and weights among nodes may be calibrated) by inputting feedback (e.g., target class recall rate selections) and/or input from a user to correct/force the neural network to arrive at an expected output. In embodiments, the impact of the feedback on the weights and biases may lessen over time, in order to correct for inconsistencies among user(s). In embodiments, the degradation of the impact may be implemented using a half-life (e.g., the impact degrades by 50% for every time interval of X that has passed) or similar model (e.g., a quarter-life, three-quarter-life, etc.).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Figure 7:
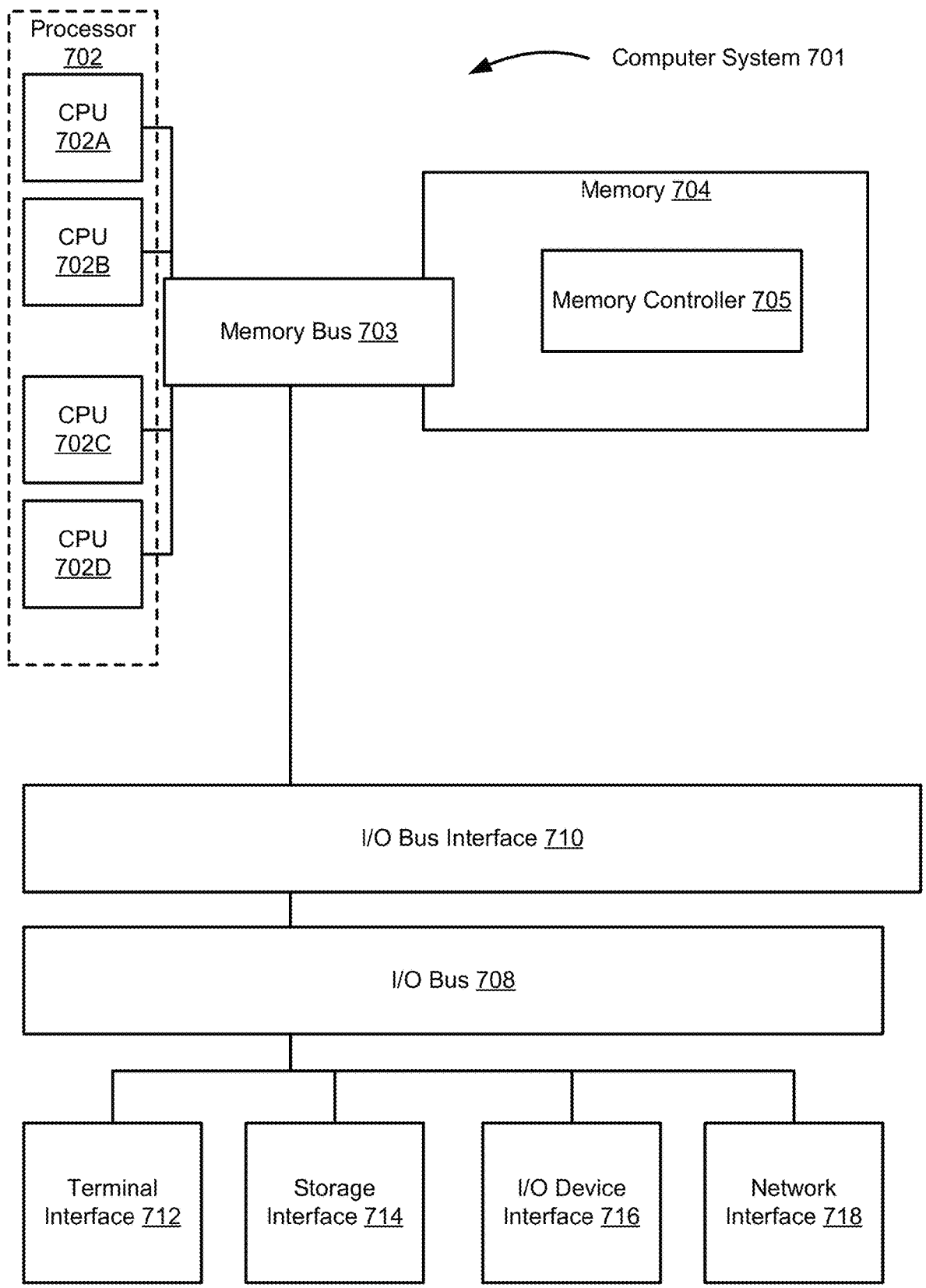
FIG. 7 illustrates a high-level block diagram of an example computer system that may be used in implementing embodiments of the present disclosure.

Referring now to FIG. 7, shown is a high-level block diagram of an example computer system 701 that may be configured to perform various aspects of the present disclosure, including, for example, methods 300 & 400, described in FIGS. 3 and 4, respectively. The example computer system 701 may be used in implementing one or more of the methods or modules, and any related functions or operations, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 714, an I/O (Input/Output) device interface 716, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may comprise one or more levels of on-board cache.

In some embodiments, the memory subsystem 704 may comprise a random-access semiconductor memory, storage device, or storage medium (either volatile or non-volatile) for storing data and programs. In some embodiments, the memory subsystem 704 may represent the entire virtual memory of the computer system 701, and may also include the virtual memory of other computer systems coupled to the computer system 701 or connected via a network. The memory subsystem 704 may be conceptually a single monolithic entity, but, in some embodiments, the memory subsystem 704 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 704 may contain elements for control and flow of memory used by the CPU 702. This may include a memory controller 705.

Although the memory bus 703 is shown in FIG. 7 as a single bus structure providing a direct communication path among the CPUs 702, the memory subsystem 704, and the I/O bus interface 710, the memory bus 703 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, mobile device, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for enhancing target class analysis, comprising:
   ingesting a set of classifiable data, the set of classifiable data containing a plurality of classes;
   determining a target class within the plurality of classes;
   generating, using the set of classifiable data, an interactive recall rate chart, the interactive recall rate chart showing a set of target class recall rates against a set of class recall rates for a remainder of the plurality of classes;
   presenting, to a user, the interactive recall rate chart;
   receiving, from the user, a target class recall rate selection from the set of target class recall rates;
   displaying the target class recall rate selection on the interactive recall rate chart;
   adjusting the set of classifiable data, based on the target class recall rate selection;
   filtering the set of classifiable data based on the adjusting of the set of classifiable data and the target class recall rate selection;
   generating, using the filtered set of classifiable data, a revised interactive recall rate chart, the interactive recall rate chart showing a revised set of target class recall rates against a revised set of class recall rates for a revised remainder of the plurality of classes;
   presenting, to the user, the revised interactive recall rate chart;
   receiving, from the user, a secondary class recall rate selection from the revised set of target class recall rates;
   displaying the secondary class recall rate selection on the interactive recall rate chart; and
   adjusting the filtered set of classifiable data, based on the secondary class recall rate selection.

2. The method of claim 1, wherein the set of classifiable data includes a classification tree.

3. The method of claim 2, wherein generating the interactive recall rate chart comprises:
   sorting a set of leaf nodes within the classification tree according to a set of probability thresholds;
   calculating the set of target class recall rates, according to the set of probability thresholds;
   computing a G-mean, an F-measure, and a maximum overall accuracy suggestion for the set of target class recall rates and the set of class recall rates for the remainder of the plurality of classes; and
   determining, for each class within the plurality of classes, a best recall rate.

4. The method of claim 3, wherein presenting the interactive recall rate chart includes pre-selecting a best recall rate.

5. The method of claim 4, wherein the classification tree is a Chi-squared Automatic Interaction Detection.

6. The method of claim 5, wherein the plurality of classes includes at least three classes.

7. The method of claim 6, wherein:
   adjusting the set of classifiable data includes adjusting a weight and a bias of one or more neural network edges; and
   adjusting the filtered set of classifiable data includes further adjusting the weight and the bias of one or more neural network edges.

8. A computer program product for enhancing target class analysis, the computer program product comprising a computer readable storage medium having program instructions embodied therewith, the program instructions executable by a device to cause the device to:
   ingest a set of classifiable data, the set of classifiable data containing a plurality of classes;
   determine a target class within the plurality of classes;
   generate, using the set of classifiable data, an interactive recall rate chart, the interactive recall rate chart showing a set of target class recall rates against a set of class recall rates for a remainder of the plurality of classes;
   present, to a user, the interactive recall rate chart;
   receive, from the user, a target class recall rate selection from the set of target class recall rates;
   display the target class recall rate selection on the interactive recall rate chart;
   adjust the set of classifiable data, based on the target class recall rate selection;
   filter the set of classifiable data based on the adjusting of the set of classifiable data and the target class recall rate selection;
   generate, using the filtered set of classifiable data, a revised interactive recall rate chart, the interactive recall rate chart showing a revised set of target class recall rates against a revised set of class recall rates for a revised remainder of the plurality of classes;
   present, to the user, the revised interactive recall rate chart;
   receive, from the user, a secondary class recall rate selection from the revised set of target class recall rates;
   display the secondary class recall rate selection on the interactive recall rate chart; and
   adjust the filtered set of classifiable data, based on the secondary class recall rate selection.

9. The computer program product of claim 8, wherein the set of classifiable data includes a classification tree.

10. The computer program product of claim 9, wherein generating the interactive recall rate chart comprises:
sorting a set of leaf nodes within the classification tree according to a set of probability thresholds;
calculating the set of target class recall rates, according to the set of probability thresholds;
computing a G-mean, an F-measure, and a maximum overall accuracy suggestion for the set of target class recall rates and the set of class recall rates for the remainder of the plurality of classes; and
determining, for each class within the plurality of classes, a best recall rate.

11. The computer program product of claim 10, wherein presenting the interactive recall rate chart includes pre-selecting a best recall rate.

12. The computer program product of claim 11, wherein the classification tree is a Chi-squared Automatic Interaction Detector.

13. The computer program product of claim 12, wherein the plurality of classes includes at least three classes.

14. The computer program product of claim 13, wherein:
adjusting the set of classifiable data includes adjusting a weight and a bias of one or more neural network edges; and
adjusting the filtered set of classifiable data includes further adjusting the weight and the bias of one or more neural network edges.

15. A system for enhancing target class analysis, comprising:
a memory with program instructions included thereon; and
a processor in communication with the memory, wherein the program instructions cause the processor to:
ingest a set of classifiable data, the set of classifiable data containing a plurality of classes;
determine a target class within the plurality of classes;
generate, using the set of classifiable data, an interactive recall rate chart, the interactive recall rate chart showing a set of target class recall rates against a set of class recall rates for a remainder of the plurality of classes;
present, to a user, the interactive recall rate chart;
receive, from the user, a target class recall rate selection from the set of target class recall rates;
display the target class recall rate selection on the interactive recall rate chart;
adjust the set of classifiable data, based on the target class recall rate selection;
filter the set of classifiable data based on the adjusting of the set of classifiable data and the target class recall rate selection;
generate, using the filtered set of classifiable data, a revised interactive recall rate chart, the interactive recall rate chart showing a revised set of target class recall rates against a revised set of class recall rates for a revised remainder of the plurality of classes;
present, to the user, the revised interactive recall rate chart;
receive, from the user, a secondary class recall rate selection from the revised set of target class recall rates;
display the secondary class recall rate selection on the interactive recall rate chart; and
adjust the filtered set of classifiable data, based on the secondary class recall rate selection.

16. The system of claim 15, wherein the set of classifiable data includes a classification tree.

17. The system of claim 16, wherein generating the interactive recall rate chart comprises:
sorting a set of leaf nodes within the classification tree according to a set of probability thresholds;
calculating the set of target class recall rates, according to the set of probability thresholds;
computing a G-mean, an F-measure, and a maximum overall accuracy suggestion for the set of target class recall rates and the set of class recall rates for the remainder of the plurality of classes; and
determining, for each class within the plurality of classes, a best recall rate.

18. The system of claim 17, wherein presenting the interactive recall rate chart includes pre-selecting a best recall rate.

19. The system of claim 18, wherein the classification tree is a Chi-squared Automatic Interaction Detector.

20. The system of claim 19, wherein the plurality of classes includes at least three classes.

* * * * *